United States Patent [19]
Langner

[11] Patent Number: 5,269,629
[45] Date of Patent: Dec. 14, 1993

[54] ELASTOMERIC SWIVEL SUPPORT ASSEMBLY FOR CATENARY RISER

[75] Inventor: Carl G. Langner, Spring, Tex.

[73] Assignee: Shell Oil Company, Houston, Tex.

[21] Appl. No.: 737,010

[22] Filed: Jul. 29, 1991

[51] Int. Cl.[5] .............................. E02D 21/00
[52] U.S. Cl. ........................ 405/195.1; 405/158; 405/223.1; 166/367; 285/223
[58] Field of Search ............ 405/154, 158, 166, 168.1, 405/172, 195.1, 203, 223.1, 224.2, 224.3; 285/223, 263; 166/338, 339, 341-345, 349, 350, 359, 367

[56] References Cited

U.S. PATENT DOCUMENTS

| | | | |
|---|---|---|---|
| 3,698,199 | 10/1972 | Matthews | 166/345 X |
| 3,794,125 | 2/1974 | Nelson | 166/350 X |
| 4,076,284 | 2/1978 | Herbert et al. | 285/263 |
| 4,225,270 | 9/1980 | Dareing | 405/158 X |
| 4,273,363 | 6/1981 | Angel | 285/263 X |
| 4,277,202 | 7/1981 | Archambaud et al. | 166/343 X |
| 4,489,962 | 12/1984 | Caumont et al. | 285/263 |
| 4,643,614 | 2/1987 | Laursen | 166/350 X |
| 4,648,751 | 3/1987 | Coleman | 405/203 X |
| 4,695,191 | 9/1987 | Wagstaff | 405/195.1 |
| 4,704,050 | 11/1987 | Wallace | 405/224.2 |
| 5,092,711 | 3/1992 | Langner | 405/195.1 X |

FOREIGN PATENT DOCUMENTS

| | | | |
|---|---|---|---|
| 700070 | 12/1964 | Canada | 285/223 |
| 94410 | 7/1960 | Netherlands | 405/166 |

Primary Examiner—Dennis L. Taylor
Assistant Examiner—John Ricci

[57] ABSTRACT

A method and apparatus is described for installing an export production riser on an offshore production platform that moves in response to ocean waves, wind and currents. The riser is provided with a catenary shape between the near vertical connection on the platform and the horizontal position on the seafloor. The upper end of the riser is maintained at a nominal inclination from the vertical to control excessive bending stresses in the riser. A flexible joint is provided at the upper end of the riser to allow rotational movement between the riser and platform as the platform moves.

10 Claims, 7 Drawing Sheets

ELASTOMERIC SWIVEL SUPPORT ASSEMBLY FOR CATENARY RISER

BACKGROUND OF THE INVENTION

The present invention relates to floating offshore production platforms and particularly to the provision for export production risers on floating offshore production platforms. The term "floating offshore production platforms" is used to refer to a production platform that utilizes self-buoyancy of the platform to support the above-water structure and equipment, including piping, machinery, crew quarters, etc., and therefore is subject to the wind, wave and current action of the open ocean. These platforms include tension leg platforms restrained in position by tendons that are coupled to foundation structures secured to the ocean floor and floating platforms that are anchored in position by conventional anchors and mooring lines. Also included in the category of floating offshore production platforms are compliant towers that utilize a long slender structural tower in which the fundamental natural period of vibration is much longer than the natural wave periods. These platforms, while anchored to the ocean floor by conventional piles driven into the earth, may be used in deeper waters than normal bottom-rounded platforms. The water depths for any of these platforms are generally beyond the depth at which divers can operate and all subsea operations must be remotely controlled and operated.

In bottom-supported platforms it has been the customary practice to install the production export risers by clamping them directly onto the sides of the platform and to use a gentle bend in the export riser at the ocean floor to connect it to the horizontal pipeline that is used to transport the production ashore. This type of export riser cannot be used with a movable platform since the constant moving of the platform would subject the connection between the vertical portion of the riser and the horizontal portion to excessive stresses. Further, except in the case of a compliant tower platform, there is not sufficient structure available to clamp the vertical portion of the riser to the platform as is done in the case of bottom-supported platforms.

One type of riser that is sometimes used in conjunction with a floating production platform is the vertical tensioned riser. This type of riser is suspended vertically from the platform and connected vertically to a subsea structure anchored to the ocean floor. Piping and connections which are part of this subsea structure connect the vertical riser to the horizontal pipeline conveying the production ashore. This system requires the installation of a subsea structure onto the seafloor and the make-up of mechanical connections between the pipeline and the structure and between the riser and the structure using remotely operated vehicles. Due to the remoteness of these connections, there is high probability of having trouble both with the make-up of the connections and subsequently with leakage. This type of structure is very difficult to service since even the servicing would require remotely operated vehicles.

Another possible solution to the problem would be the use of a system similar to single-point mooring buoys that are used for offloading tankers offshore, employing flexible hose between the single-point mooring buoy and the platform. Among the difficulties of this system are interference between the mooring lines for the buoy and the platform, if any, and the restriction of vessel movements around the vicinity of the platform since they have to remain clear of the single-point mooring buoy. Likewise, the flexible hoses used in this type of system are expensive, heavy, and susceptible to collapse failure, and are high maintenance items requiring constant surveillance and frequent replacement.

SUMMARY OF THE INVENTION

The present invention solves the above problems of export production risers on moving platforms by utilizing conventional steel pipelines laid horizontally onto the seafloor with the ends of the pipelines being suspended from the platform so that the portion between the ocean floor and the platform is in the form of a catenary curve. This type of suspension provides sufficient flexibility in the riser to allow the platform to move without producing excessive stresses in the suspended (unsupported) portion of the riser. The connection between the riser and the platform structure includes a flexible joint which permits relative angular rotations while constraining longitudinal and lateral displacements. This flexible connection provides sufficient angular flexibility between the upper end of the riser and the rigid piping on the platform to maintain the stress level at the upper end of the riser within acceptable limits.

An additional feature of the present invention is the location of the end of the catenary portion of the riser and the flexible joint below the water surface. In particular, the connection is located between 40 and 400 feet below the water surface which removes this portion of the system from the highly corrosive environment that occurs near the water surface, and from the most severe effects of currents and wave action. Elimination of the corrosive splash-zone environment and the reduction of current and wave effects greatly increase the reliability of the system.

DESCRIPTION OF A PREFERRED EMBODIMENT

Figure 1:
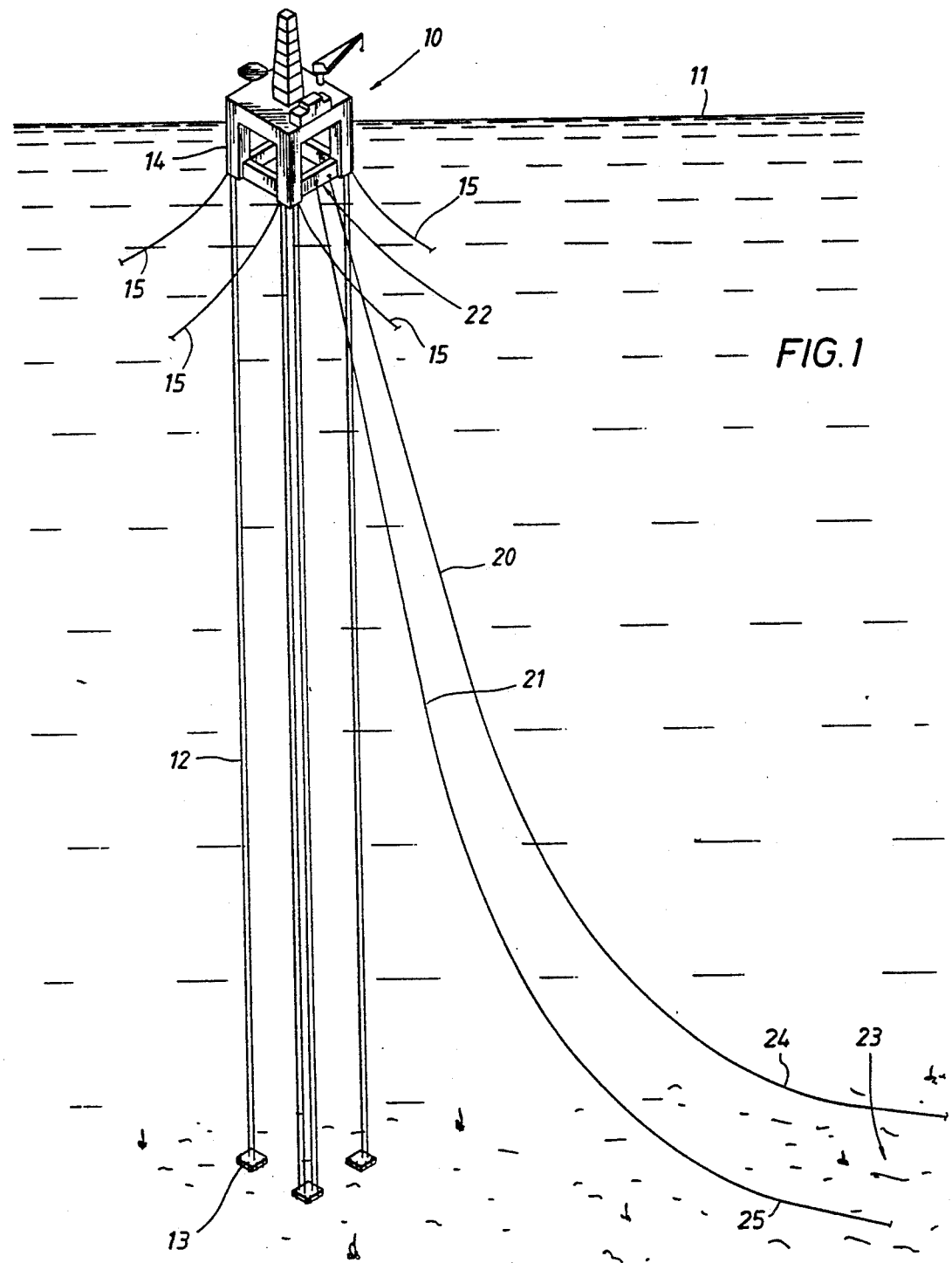
FIG. 1 is a pictorial view of the risers installed on a tension leg platform.

Referring to FIG. 1 there is shown a tension leg platform (TLP) 10 floating on a water surface 11. The platform is secured to the ocean floor by means of tendons 12 and foundation templates 13. In addition, the platform utilizes a series of lateral mooring lines 15 which are secured to the vertical columns 14 located at the four corners of the platform. The lateral mooring lines are used to move the platform laterally and to resist lateral storm loadings. Controlled lateral movements are particularly useful when it is desired to position the platform vertically over a particular subsea well so that the well can be serviced.

Two export production risers 20 and 21 are shown extending from the pontoon 22 of the platform to the seafloor where they touch down in the area 23. From the area 23 to the shore or other destination, the export risers are, in effect, a horizontal pipeline. The present invention requires that the horizontal portion 24 and 25 each export riser beyond the touchdown area 23 be anchored in position so that it does not move longitudinally as the platform 10 moves in response to wind, wave or other forces such as the lateral mooring lines 15. The anchoring of the horizontal portion of the export risers generally can be achieved by laying the horizontal portion beyond the touchdown point as a continuous straight line extension of the suspended riser and by ensuring that the pipeline itself has sufficient weight on bottom to serve as an effective anchor. Alternately, anchor means may be attached to the pipeline to prevent its horizontal movement in response to the platform movement.

Figure 2:
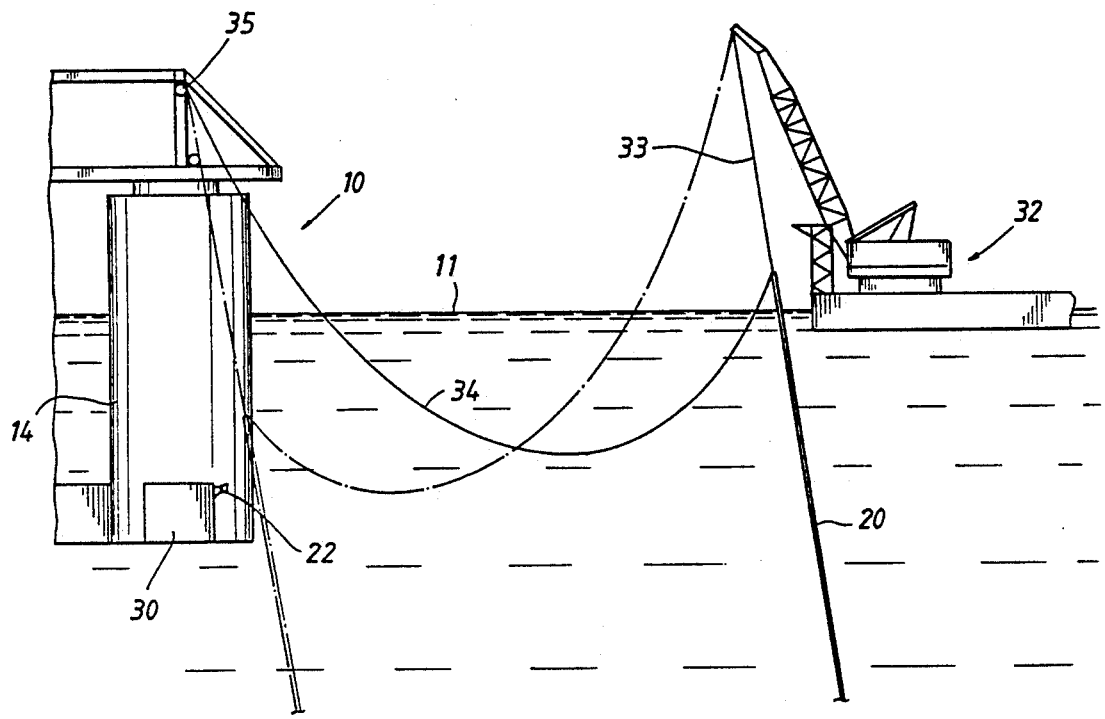
FIGS. 2-5 illustrate the various steps involved in installing the export production riser on the platform.

Referring now to FIGS. 2-5, there is shown the steps involved in installing one of the export risers 20 and 21 on the platform 10. In particular, in FIG. 2, riser 20 is shown supported by the hoisting cable 33 of the derrick on the lay barge 32. The lay barge could be the barge that was utilized in laying the pipeline from a shore installation to the Platform or it may be an auxiliary vessel. A second hoisting line 34 extends from a winch 35 located below the top deck of the platform 10 to the end of the riser 20. The riser is transferred from the lay barge to the platform by paying out the hoist line 33 while taking in the line 34. In this manner, the riser can be transferred to the dotted position shown in FIG. 2. Also shown in FIG. 2 is a receptacle 22 which is attached to the side of the pontoon 30 of the platform. The receptacle is used to support the riser on the platform by capturing and holding the external housing of a flexible joint installed on the riser.

Figure 3:
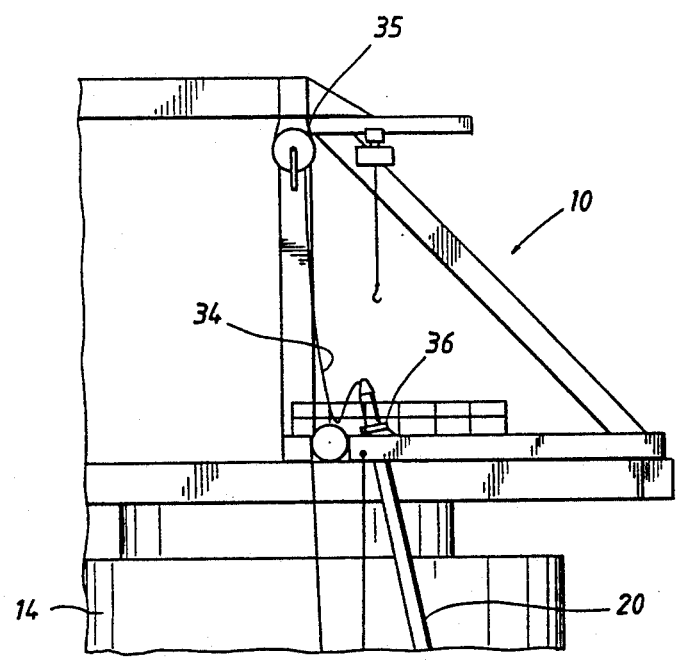

Referring to FIG. 3, the riser 20 is shown secured onto the lower deck of the platform in a suitable fixture by means of a clamp and support collar or other pipe gripping means. The support collar 36 is attached to the riser when the riser is fabricated on the lay barge 32 prior to its transfer to the platform.

Figure 4:
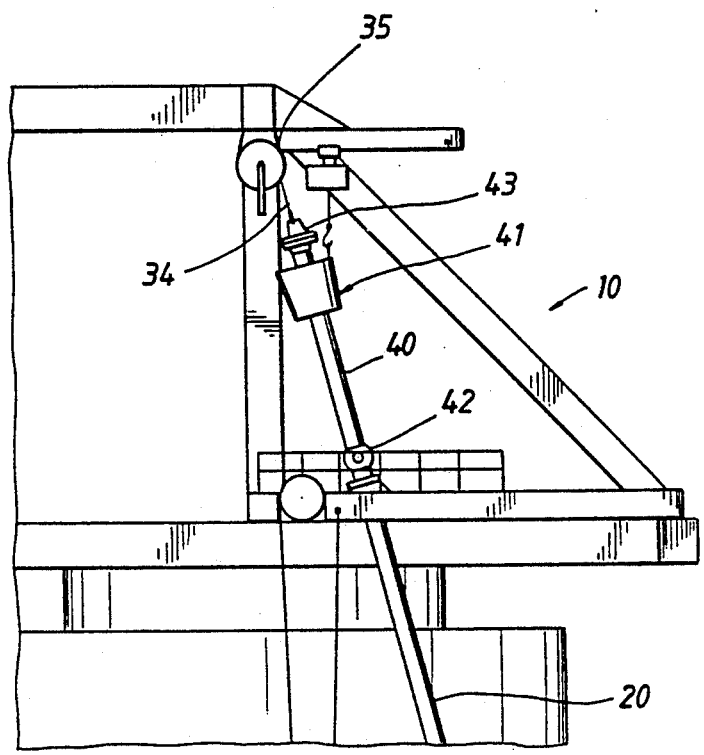

Referring to FIG. 4, there is shown the means by which the pipe section 40 is attached to the end of the riser 20. The pipe section 40 includes a special flexible joint 41 at its upper end and a shutoff valve 42 at its lower end. The provision of the shutoff valve 42 allows the riser to be lifted from its normal submerged position to the platform deck where the flexible joint 41 may be serviced as required. The upper end of the flexible joint includes a suitable lifting eye arrangement 43 which is shown in more detail in FIG. 6.

Figure 5:
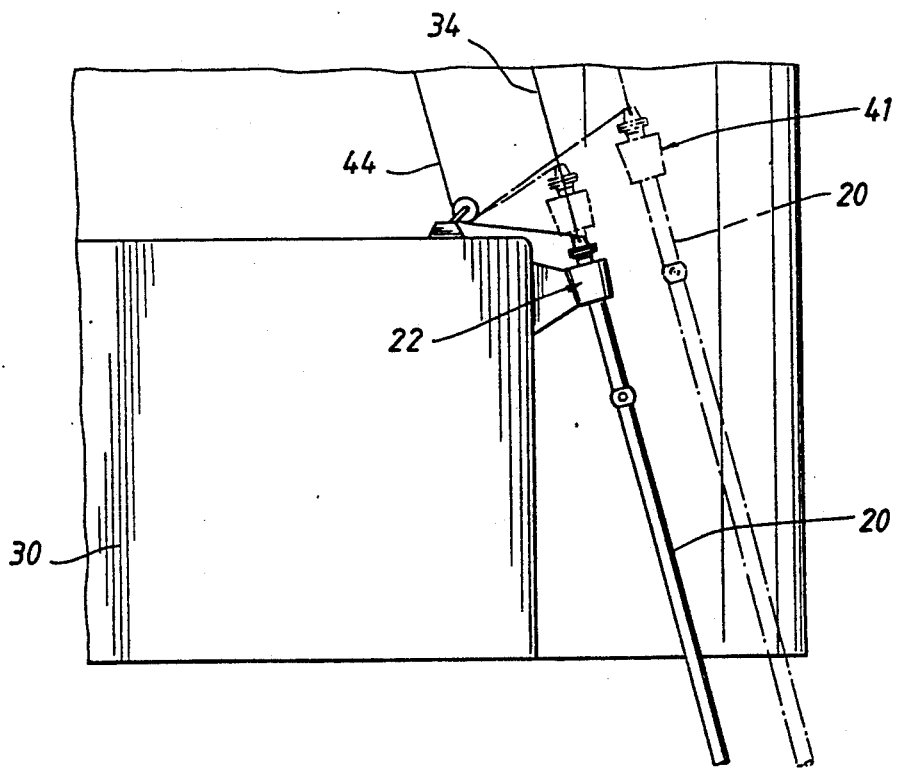

After the special pipe section 40 and the flexible joint 41 have been installed on the end of the riser, the riser is lowered into the receptacle 22 that supports it on the platform. This operation is accomplished by lowering the winch line 34 while taking in on a suitable tag line 44 as shown in FIG. 5. By this means the riser may be lowered and moved horizontally so that the flexible joint 41 is captured and held by the receptacle 22. In this manner, the flexible joint is used both to support the weight of the catenary portion of the export riser and to provide the necessary flexibility between the riser and the rigid piping positioned on the platform.

Figure 6:
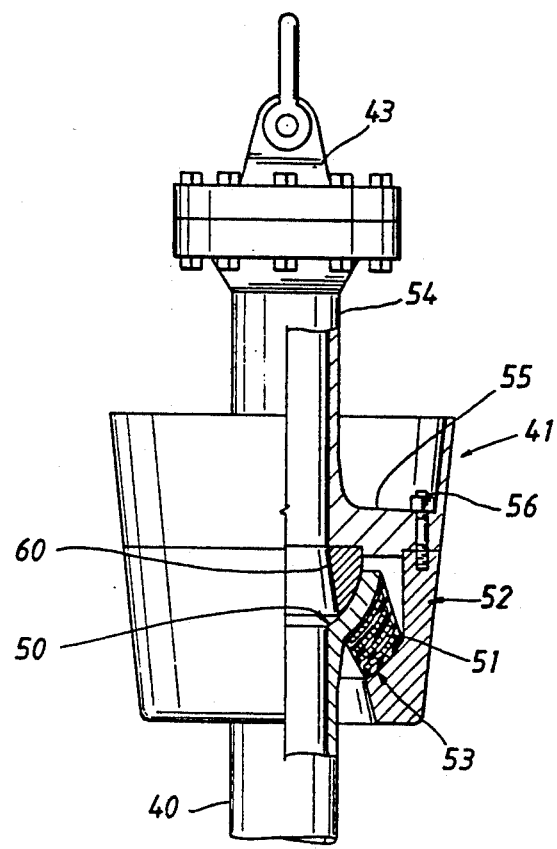
FIG. 6 is a side view of the upper end of the export production riser including the flexible joint.
Figure 7:
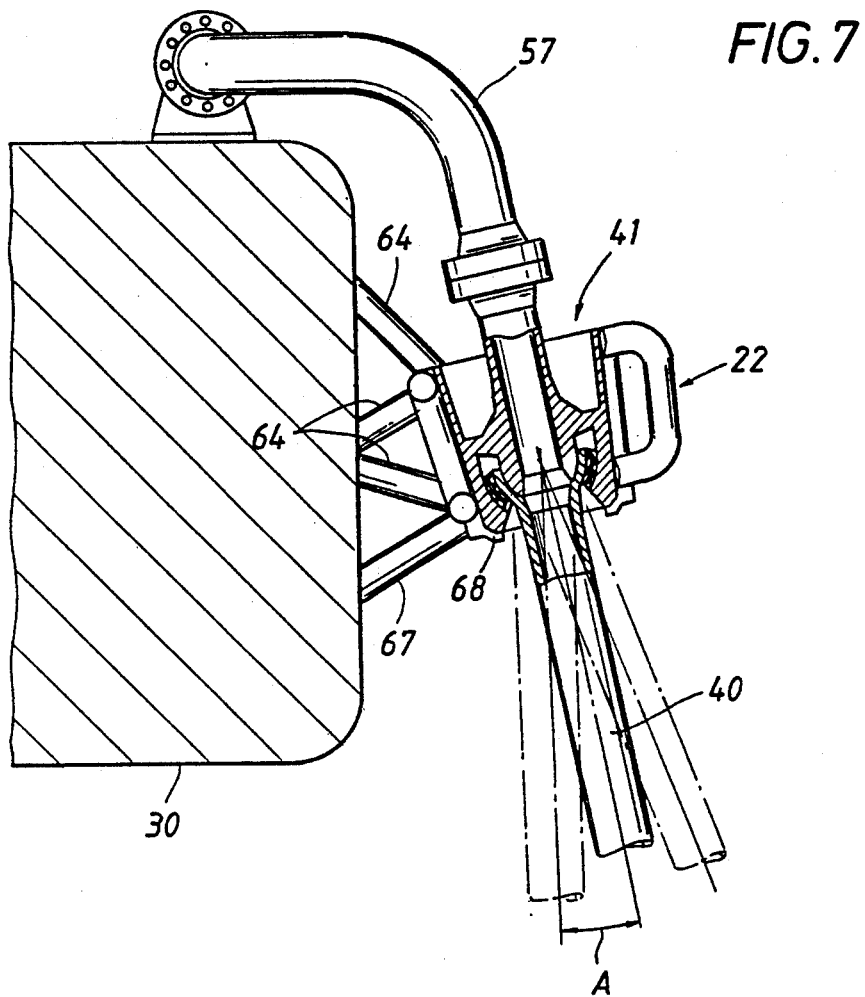
FIG. 7 is a view, partially in section, showing the riser including the flexible joint secured to the lower pontoon of the platform shown in FIG. 1.

Referring to FIGS. 6 and 7, there is shown the details of the flexible joint as well as the method utilized for connecting the top of the flexible joint assembly to the export piping that is rigidly installed on the platform. More particularly, in FIG. 6 there is shown the details, partially in section, of the flexible joint 41. The flexible joint consists of a spherical end section 50 which is an integral part of the pipe section 40. The spherical end section 50 is supported by a flexible assembly 51 which in turn is supported by the lower end of the outer housing 52 of the flexible joint. The flexible assembly 51 is formed by vulcanizing together alternating layers of elastomer, such as nitrile rubber, and steel, while simultaneously bonding the flexible element to the riser end section 50 and the inwardly projecting surface 53 of the outer housing 52. As shown in the drawings, the support surface 53 of the outer housing 52, and the alternating layers of elastomer and steel comprising the flexible assembly 51, are all spherically shaped and concentric with the spherical end section 50 of the riser. In addition, the housing 52 is provided with a tapered outer wall so that it will be self centering and will be firmly seated and supported in the receptacle 22 described below The flexible joint is completed by an upper pipe section 54 which has a flange 55 formed on its lower end. The flange 55 is secured to the housing 52 by a series of studs 56. A spherical member 60 which fits in a recess in the bottom of the flange 55 is used to provide mechanical alignment between the spherical end section 50 and the pipe section 54. The two mating spherical surfaces allow rotations while preventing lateral displacements between the sections 40 and 54 of the flexible joint. The layers of vulcanized elastomer in the flexible assembly 51 maintain the fluid-tight seal between the two sections. This type of flexible connector is commercially available from various manufacturers, as for example, Murdock Engineering Company of Irving, Texas, or Oil States Industries of Arlington, Tex. The connector is more specifically described in pages 5208.1 and 208.2 of the Composite Catalog of Oilfield Equipment and Services, 1989-1990 edition. In order to maintain the stresses in the upper portion of the riser within an acceptable range, the rotational stiffness of the flexible joint must fall within a certain range, as explained below.

Referring to FIG. 7, there is shown details of receptacle 22 which is used for supporting the flexible joint 41 and the production export riser 20. In particular, the receptacle is formed of tubular members shown in greater detail in FIGS. 8 and 9 and described below. The receptacle is provided with a bottom flange member 68 which supports the lower end of the housing 52 of the flexible joint. The receptacle is also provided with a tapered inner surface so that as the riser and the flexible joint are lowered into position, they will be centered in the receptacle and supported by the flange 68. The receptacle is positioned on the pontoon 30 so that the export riser extends downwardly from the pontoon at an angle A which is within the range of 5 to 20 degrees, depending on the water depth. By positioning the upper end of the export riser at an angle falling within the 5- to 20-degree range, depending on the water depth, the stresses in the bottom bend of the catenary curve of the riser are maintained within an acceptable range as explained below. The connection between the export riser and the flexible joint is completed by a special pipe section 57 which is coupled by means of flanges to both the piping on the platform and the export riser. Since the end of the export riser is located at approximately 40-400 feet below the water surface, this section of pipe can be installed by conventional divers.

Figure 8:
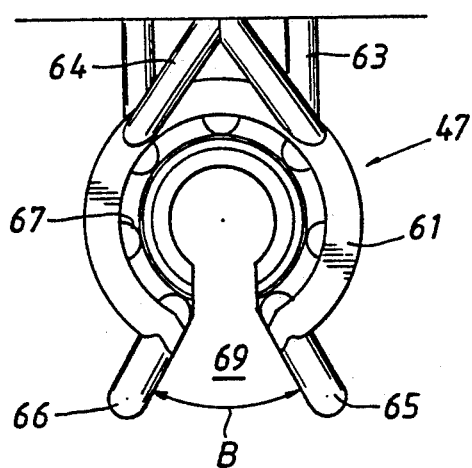
FIG. 8 is a top view of a receptacle which is attached to the platform for supporting the flexible joint and the riser shown in FIG. 6.
Figure 9:
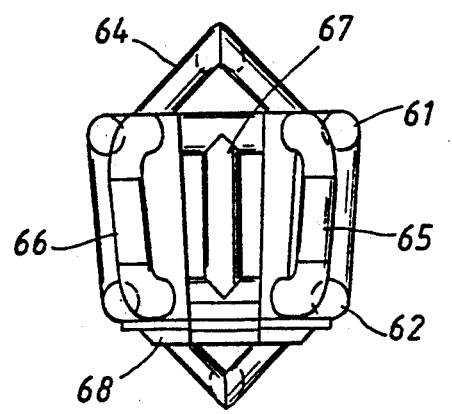
FIG. 9 is a front view of the receptacle shown in FIG. 8.

Referring now to FIGS. 8 and 9, there is shown a top view and a front view of the receptacle for the flexible joint shown in FIG. 7. More particularly, the receptacle consists of an upper circular member 61 and a lower circular member 62. As can be seen from the top view FIG. 8, the circular members are not complete but have an opening or key slot 69 through which the production export riser 20 may be installed. To assist in directing the riser 20 into the receptacle, U-shaped members 65 and 66 are attached to the ends of the circular members 61 and 62 adjacent the sides of the opening 69. The opening 69 preferably has an angular dimension B in the range of 60 to 75 degrees. This provides a sufficient opening for moving the riser into the receptacle and yet provides substantial support for the housing 52 of the flexible joint. The two circular members are spaced apart by a series of vertical tubular members 67 as shown in the Figures. The members 67 are positioned so that their inner surfaces are flush with the inner circumference of the two circular members. The supporting flange 68 that supports the housing of the flexible joint is fastened to the lower surface of the circular member 62 by suitable means such as welding. The receptacle is attached to and supported from the side of the pontoon 30 by a structural tubular network consisting of the members 63 and the braces 64 as shown in FIGS. 7, 8 and 9. All of the radii between the junction of the various tubular members that form the receptacle should be sufficiently blunt so as not to damage the housing of the flexible joint as it is moved into the receptacle. For example, a 3-inch radius on all surfaces has been found to be sufficient when the housing of the flexible joint has an overall diameter of approximately 40 inches and the export riser had a diameter of between 12 and 16 inches.

Figure 10:
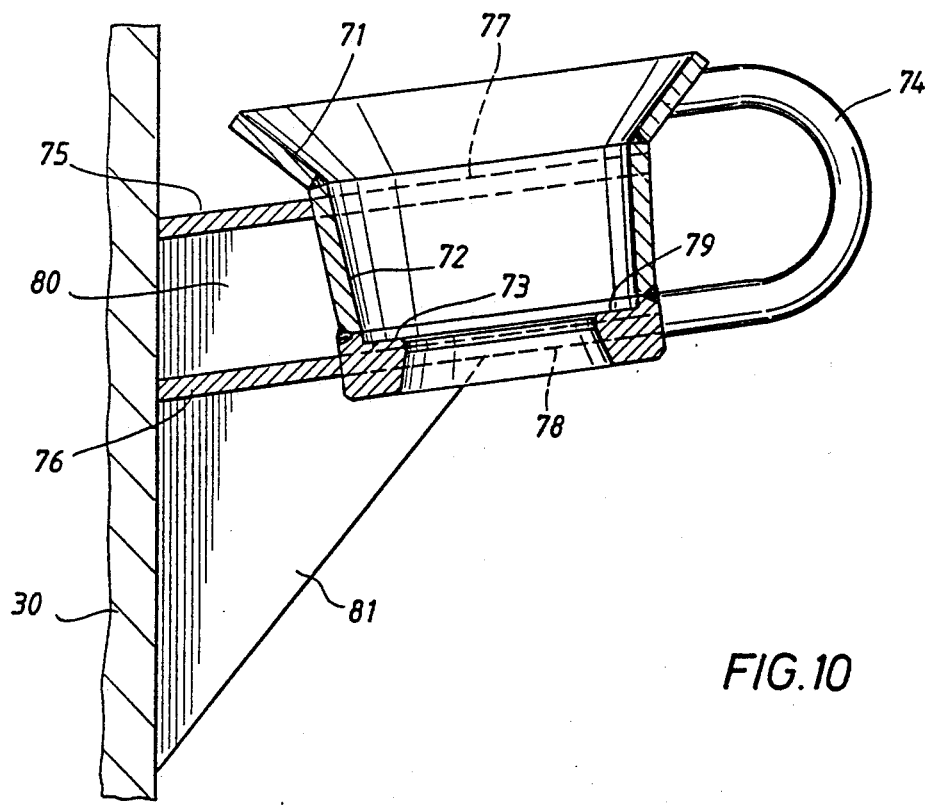
FIG. 10 is a view, partially in section, of a second embodiment of a receptacle suitable for supporting the flexible joint shown in FIGS. 6 and 7.

Referring now to FIG. 10 there is shown another design of a receptacle for holding the flexible joint. The receptacle shown in FIG. 10 is a plate-type receptacle in which the top is formed by a conical shaped piece 71 which is joined to the body of the receptacle 72 to form a funnel-shaped entrance for guiding the housing of the flexible joint into position. The bottom flange 73 is joined to the side wall 72 by suitable means such as welding or the like. As shown in the cross section of FIG. 10, the upper surface 79 of the bottom flange is inclined at a slight downward angle which assists in centering the housing of the flexible joint in the receptacle. The receptacle is provided an opening similar to the opening 69 shown in FIG. 8 and with suitable tubular guide members 74 positioned on each side of the opening. The receptacle is supported and attached to the side wall of the pontoon 30 by two spaced-apart, substantially horizontal plates 75 and 76. As shown, the plates are substantially wider than the overall diameter of the receptacle and surround the receptacle as shown by the dotted lines 77 and 78. Suitable vertical members 80 are positioned to maintain the plates in position and prevent them from buckling under load. The receptacle is completed by a series of triangular braces 81 which support the receptacle from the side wall of the pontoon. The receptacle shown in FIG. 10 provides more support for the housing of the flexible joint and may in certain circumstances be preferable to the tubular structure shown in FIGS. 7 and 8.

From the above description of the preferred embodiments of the invention, it is seen that the invention has provided a method and means for installing an export production riser on the side of a movable platform. The export riser is suspended below the water line of the platform and is restrained at its upper end and at its bottom end so that the riser 25 assumes a catenary curve shape. Together with a flexible joint at the upper end of the riser, this catenary shape provides sufficient flexibility in the riser to allow the platform to move on the surface of the body of water without producing undue stress levels in the riser.

The following design relationships determine the nominal top angle $\phi$ and the nominal horizontal tension $T_o$ corresponding to an allowable sagbend stress $\sigma$ for a steel catenary riser:

$$T_o = DEW/2\sigma, \quad T = T_o + WH,$$

$$\phi = \arcsin(T_o/T) + (WT_o/T^2)(B/T)^{\frac{1}{2}} \qquad (1)$$

where
D = riser outside diameter,
E = riser elastic modulus,
W = riser weight per unit length,
B = riser bending stiffness,
T = riser top tension, and
H = water depth at platform.

As a design criterion, assume that the sagbend stress $\sigma$ falls within the range 20-30 ksi, with the platform in its mean (centered) position. (Note 1 ksi 1000 pounds per square inch.) This criterion ensures that the combined stresses in the sagbend portion of the riser will remain within the elastic limits under normal operations conditions and during all but the most severe storm conditions, depending on the water depth and the type of platform.

Figure 11:
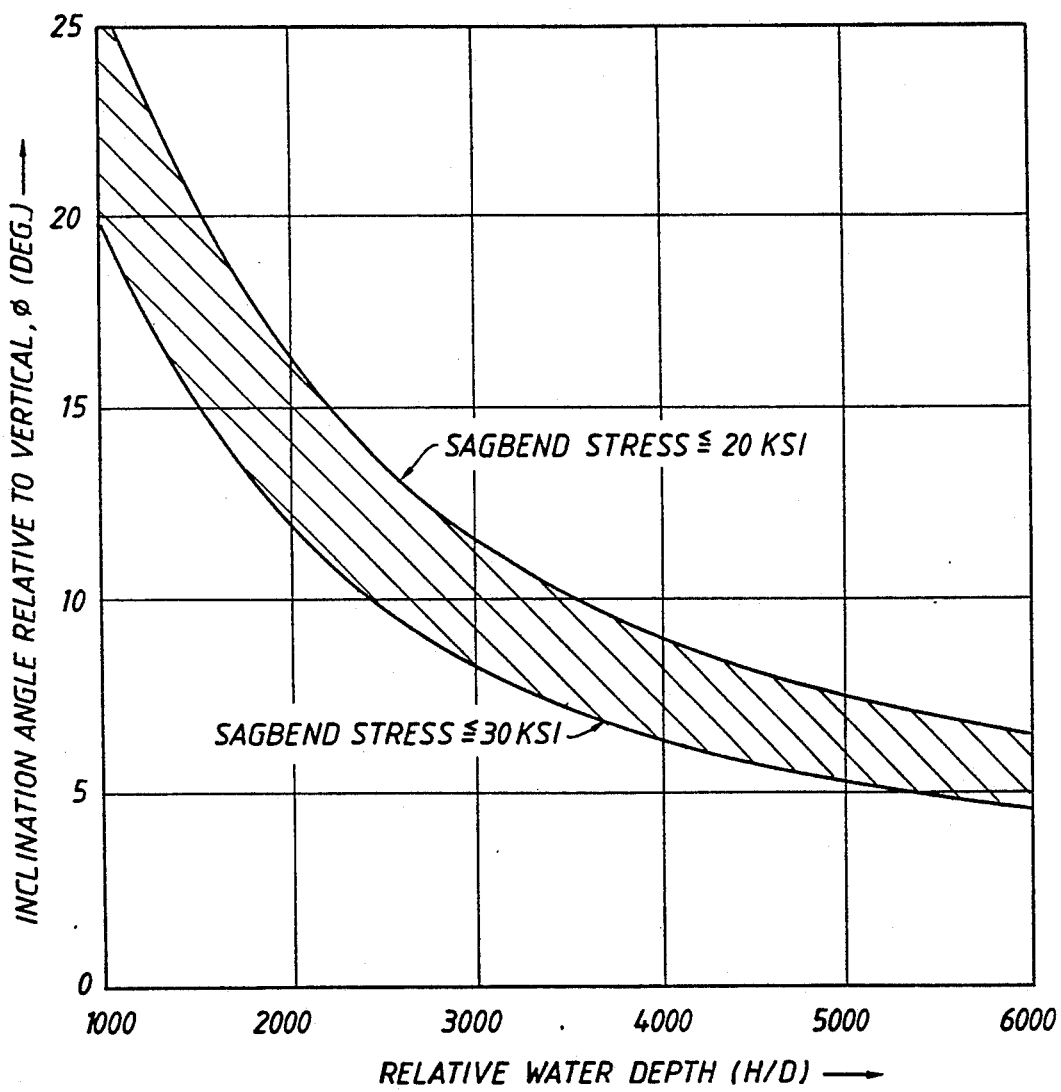
FIG. 11 is a plot of the inclination angle at the top of the riser versus depth of water.

FIG. 11 shows the relationship between the riser top angle $\phi$ (i.e., the angle with respect to vertical at which the riser exits the platform) and the relative water depth H/D, resulting from the above criterion. For relatively shallow water, say H/D = 1500, a nominal top angle of $\phi = 15$-20 degrees is appropriate, whereas for deeper water, say H/D = 5500, a much steeper angle $\phi = 5$-7 degrees is required. Additional design relationships apply for the flexible joint at the top of a steel catenary riser. The stresses in the riser near the upper end will be maintained within an acceptable range provided that the rotational stiffness $S_f$ and the maximum deflection angle $\Delta\phi$ of the flexible joint obey the design equations $$\sqrt{BT}/S_f = 5\text{-}10, \quad \Delta\phi = \pm\phi, \qquad (2)$$

where
B = riser bending stiffness, as before,
T = riser top tension, as before, and
$\phi$ = riser top angle, given in FIG. 11.

Equations (2) ensure that the bending stresses near the upper end of the riser will be reduced by a factor between 6 and 11, and that the fatigue life of the riser will be increased by a factor greater than 1000, when compared with a rigidly clamped steel catenary riser. The flexjoint stiffness $S_f$ to be used in the above equation is defined as the change in bending moment corresponding to a unit change in rotation angle for small rotations (i.e., the bending moment applied to the flexjoint in foot-pounds per angular deflection in radians, for riser deflection angles of one degree or less).

Figure 12:
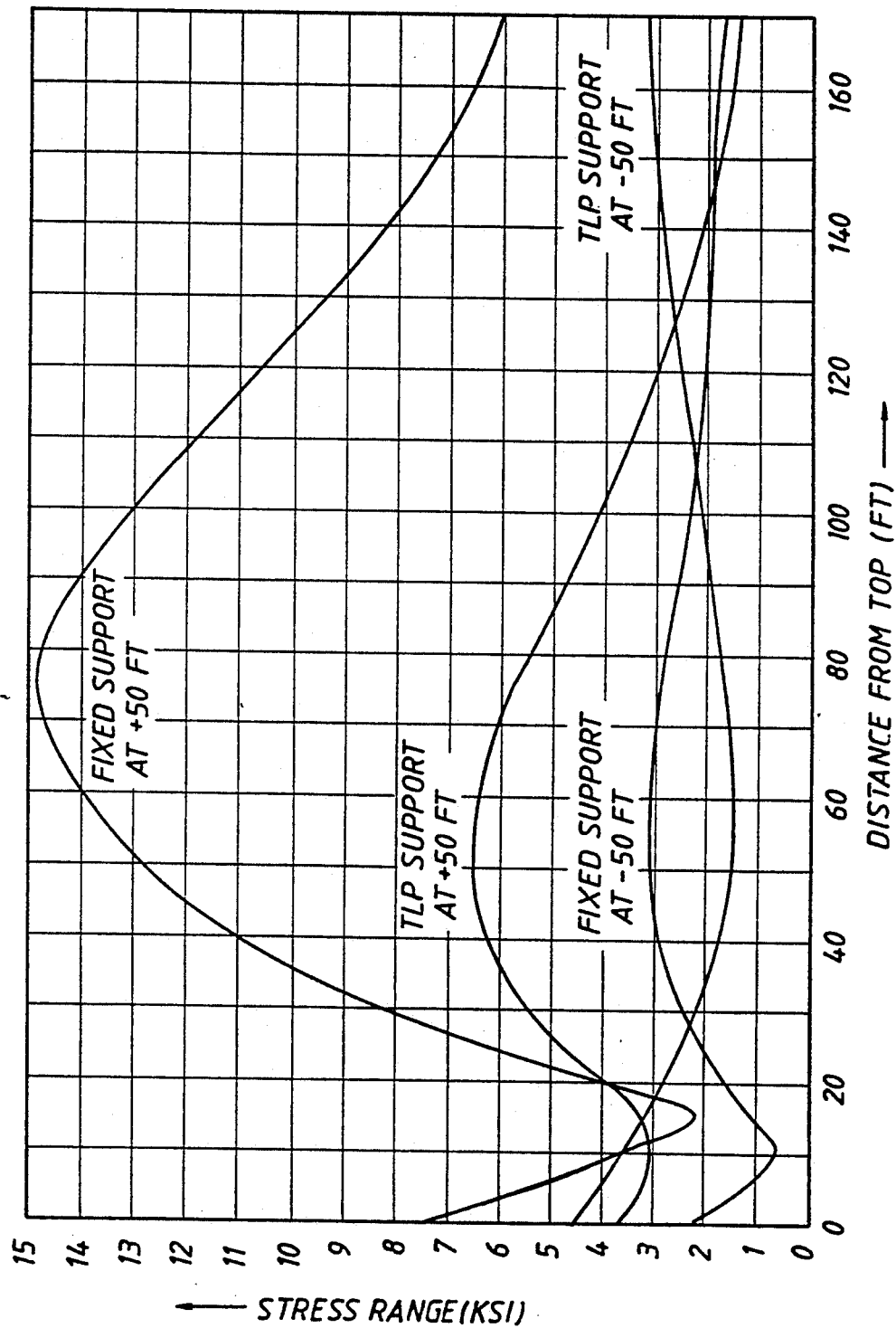
FIG. 12 is a plot of bending stress versus distance along the riser at the top end for both fixed and moving platforms.

The final design relationship has to do with the location of the flexible joint relative to the water surface. FIG. 12 illustrates variations of the cyclic stresses in a steel catenary riser near the upper end for both a fixed support (on a rigid platform) and a riser supported on a moving tension leg platform (TLP). Curves are presented for a flexjoint located either 50 feet above the mean water surface or 50 feet below water. Note how the stress range is reduced considerably, therefore enhancing the fatigue life of the riser, for a riser supported 50 feet below the water surface. In practice, the recommended placement of the flexjoint is 40-400 feet below the water line, depending on the most convenient location on a given platform.

What is claimed is:

1. A method for installing a semi-rigid export production riser on a moving production platform comprising:
   installing a flexible joint adjacent the end of the riser that is to be installed on the platform;
   suspending the riser by means of a first lift line from a work platform in a near vertical position;
   attaching a second lift line on said one end of the riser, said lift line being suspended from said production platform;
   taking in the second lift line while paying out the first lift line to move said one end of the riser from said work platform to said production platform;
   installing said flexible join( in a receptacle means secured to said production platform while suspending the portion of said riser between said production platform and the seafloor in the form of a catenary curve; and
   restricting the movement of the horizontal portion of said riser resting on the seafloor to maintain said catenary as said production platform moves relative to the horizontal portion of said riser resting on the seafloor.

2. The method of claim 1 wherein said receptacle means is installed on said production platform below the normal waterline of said production platform.

3. The method of claim 2 wherein said flexible joint is positioned in said receptacle means with the riser inclined at an angle to the vertical.

4. The method of claim 3 wherein said inclination angle of the riser is given essentially by the relationship of FIG. 11.

5. An apparatus for securing an export production riser to a moving production platform comprising:
   a cup-shaped receptacle means, said receptacle means being attached to said production platform, said receptacle in addition having a tapered sidewall to form a cup-shaped member that is larger at the top than the bottom;
   a flexible joint, said flexible joint being attached to the end of said export production riser, said flexible joint having an outer shape including a tapered sidewall that conforms to the shape of said receptacle whereby said riser and flexible joint will be supported by said cup-shaped member; and
   means for anchoring the horizontal portion of the export riser positioned on the seafloor so that the suspended portion of the export riser assumes a catenary curve shape.

6. The apparatus of claim 5 wherein said receptacle is formed from a plurality of tubular members.

7. The apparatus of claim 5 wherein said receptacle is formed from a plurality of plate members.

8. The apparatus of claim 5 wherein said receptacle is provided with a key slot of sufficient width to permit passage of said export riser.

9. The apparatus of claim 5 wherein the rotational stiffness $S_f$ of the flexible joint, the riser bending stiffness B, and the riser top tension T, are related by the equation $$\sqrt{BT}/S_f = 5 - 10.$$

10. The apparatus of claim 5 wherein the maximum angular deflection of the flexible joint is approximately equal to the riser inclination angle.

* * * * *